Patented Dec. 27, 1938

2,141,893

UNITED STATES PATENT OFFICE 2,141,893

TRIFLUOROMETHYL - ARYL - SULPHONIC ACIDS AND A PROCESS OF PREPARING THEM

Arthur Zitscher, Kronberg in Taunus, and Hans Kehlen, Offenbach-on-the-Main, Germany, assignors to General Aniline Works, Inc., New York, N. Y., a corporation of Delaware No Drawing. Application August 17, 1936, Serial No. 96,548. In Germany August 17, 1935

6 Claims. (Cl. 260—505)

The present invention relates to trifluoromethyl-aryl-sulphonic acids and to a process of preparing them; more particularly, it relates to compounds of the following formula:

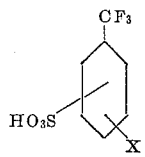

wherein X stands for a member of the group consisting of hydrogen, halogen, alkoxy, hydroxy and acylamino.

Attempts to make the hitherto unknown sulphonic acids of trifluoromethylaryls have shown that the usual sulphonating agents, such as concentrated sulphuric acid or chlorosulphonic acid fail to work. There is either no sulphonation or the trifluoromethyl radical is affected so that the products obtained by the reaction are carboxylic acids or sulphocarboxylic acids.

Now, we have found that trifluoromethyl-aryl-sulphonic acids are obtainable by treating trifluoromethylaryls, with the exception of those which contain an amino or nitro group, with sulphur trioxide, if desired, in the presence of sulphuric acid monohydrate as a diluent. The aryl radical may be further substituted, for instance, by halogen, alkoxy or acylamino groups.

The new sulphonic acids may be used as intermediate products, for instance, for the manufacture of dyestuffs.

The following examples serve to illustrate the invention, but they are not intended to limit it thereto, the parts being by weight:—

(1) 125 parts of fuming sulphuric acid containing 65 per cent. of sulphuric anhydride are added, drop by drop, while stirring, within half-an-hour to 146 parts of trifluoromethylbenzene at a temperature below 0° C. After 15 to 20 hours' standing, the mass is introduced into 1500 parts of a saturated solution of sodium chloride and the separated sodium salt of the trifluoromethyl-benzene-sulphonic acid is filtered with suction. It is washed with a small amount of a saturated solution of sodium chloride and dried.

The sodium salt is easily soluble in water; it crystallizes from a concentrated aqueous solution in the form of thin, brilliant leaflets. The barium salt is rather sparingly soluble in cold water. It crystallizes from hot water in the form of needles with 1 mol of water of crystallization.

The aniline salt of the acid crystallizes from water in the form of flat, white needles melting at 201° C. to 202° C. (uncorrected).

The sulpho group probably enters the meta-position to the trifluoromethyl group.

(2) 80 parts of sulphur trioxide are passed at ordinary temperature into 146 parts of trifluoromethyl-benzene. The liquid assumes a yellow-brown coloration with a green fluorescence. It is allowed to stand for a prolonged time (24 to 48 hours) and then slowly poured into a saturated solution of sodium chloride. The product is worked up as described in Example 1.

(3) 125 parts of fuming sulphuric acid containing 65 per cent of sulphuric anhydride are gradually added, drop by drop, while stirring, to 181 parts of 1-trifluoromethyl-4-chlorobenzene at a temperature below 0° C. After about 20 hours' standing, the mass is introduced into a saturated solution of sodium chloride. The separated sodium salt of the sulphonic acid, probably 1-trifluoromethyl-4-chlorobenzene-3-sulphonic acid, crystallizes from hot water in the form of thin plates with 1 mol of water of crystallization. The barium salt, which is rather sparingly soluble in hot water, crystallizes in regular thin plates.

(4) 80 parts of sulphur trioxide are passed at a temperature below 0° C. into 176 parts of 1-trifluoromethyl-3-methoxybenzene. After about 12 hours' standing at about 0° C. the mass is introduced into a saturated solution of sodium chloride and the whole is rendered alkaline by means of calcined sodium carbonate. The separated product is filtered with suction and dried.

On sulphonation the methoxy group is for the greater part saponified, so that mainly the sodium salt of 1-hydroxy-3-trifluoromethyl-benzene-sulphonic acid is formed, besides a small amount of 1-methoxy-3-trifluoromethyl-benzene-sulphonic acid.

(5) 30 parts of fuming sulphuric acid containing 65 per cent of sulphuric anhydride are slowly added, drop by drop, while well stirring, to a solution of 40 parts of 1-acetylamino-3-trifluoromethylbenzene in 50 parts of tetrachloroethane at room temperature. The mass is slowly heated to 145° C. and maintained at this temperature for 1 hour. After cooling, the whole is introduced into a saturated solution of sodium chloride and the separated sodium salt of 1-acetylamino-3-trifluoromethyl-benzene-sulphonic acid is filtered with suction.

We claim:

1. The process which comprises causing sulphur trioxide to act upon a compound of the following formula:

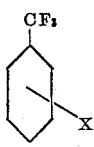

wherein X means a member of the group consisting of hydrogen, halogen, alkoxy and acylamino, standing in one of the positions meta and para to the CF₃-group.

2. The process which comprises causing sulphur trioxide in the presence of sulphuric acid monohydrate as a diluent to act upon a compound of the following formula:

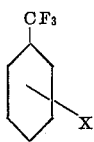

wherein X means a member of the group consisting of hydrogen, halogen, alkoxy and acylamino, standing in one of the positions meta and para to the CF₃-group.

3. The trifluoromethyl-benzene-sulphonic acids of the following formula:

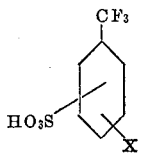

wherein X means a member of the group consisting of hydrogen, halogen, alkoxy, hydroxy and acylamino, standing in one of the positions meta and para to the CF₃-group.

4. The trifluoromethyl-benzene-sulphonic acid of the following formula:

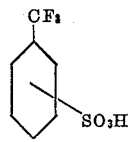

forming a sodium salt which crystallizes from a concentrated aqueous solution in the form of thin brilliant leaflets, a barium salt which crystallizes from hot water in the form of needles with 1 mol of water of crystallization and an aniline salt which crystallizes from water in the form of flat, white needles melting at 201° C. to 202° C.

5. The trifluoromethyl-benzene-sulphonic acid of the following formula:

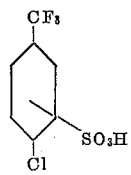

forming a sodium salt which crystallizes from hot water in the form of thin plates with 1 mol of water of crystallization and a barium salt which crystallizes in regular thin plates.

6. The trifluoromethyl-benzene-sulphonic acid of the following formula:

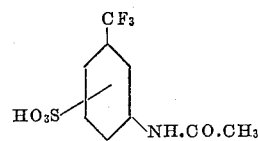

ARTHUR ZITSCHER.
HANS KEHLEN.